United States Patent
Hueda et al.

(10) Patent No.: US 10,615,880 B2
(45) Date of Patent: Apr. 7, 2020

(54) REDUCED COMPLEXITY CONSTRAINED FREQUENCY-DOMAIN BLOCK LMS ADAPTIVE EQUALIZATION FOR COHERENT OPTICAL RECEIVERS

(71) Applicant: INPHI CORPORATION, Santa Clara, CA (US)

(72) Inventors: Mario R. Hueda, Santa Clara, CA (US); Nestor D. Campos, Santa Clara, CA (US)

(73) Assignee: INPHI CORPORATION, Santa Clara, CA (US)

(*) Notice: Subject to any disclaimer, the term of this patent is extended or adjusted under 35 U.S.C. 154(b) by 0 days.

(21) Appl. No.: 16/404,547

(22) Filed: May 6, 2019

(65) Prior Publication Data

US 2019/0260477 A1    Aug. 22, 2019

Related U.S. Application Data

(63) Continuation of application No. 15/792,416, filed on Oct. 24, 2017, now Pat. No. 10,326,533.
(Continued)

(51) Int. Cl.
*H04B 10/61* (2013.01)
*H04L 25/03* (2006.01)
(Continued)

(52) U.S. Cl.
CPC ....... *H04B 10/6162* (2013.01); *H04B 10/079* (2013.01); *H04B 10/615* (2013.01);
(Continued)

(58) Field of Classification Search
CPC .. H04B 10/40; H04B 10/615; H04B 10/6162; H04B 10/6565
See application file for complete search history.

(56) References Cited

U.S. PATENT DOCUMENTS

| | | |
|---|---|---|
| 4,669,116 A | 5/1987 | Agazzi et al. |
| 5,870,372 A | 2/1999 | Kuribayashi |

(Continued)

OTHER PUBLICATIONS

Un-Ku Moon et al., "Timing Recovery in CMOS using Nonlinear Spectra-line Method", IEEE 1996 Custom Integrated Circuits Conference, 1996, pp. 13-16, IEEE.
(Continued)

*Primary Examiner* — Shuwang Liu
*Assistant Examiner* — Gina M McKie
(74) *Attorney, Agent, or Firm* — Richard T. Ogawa; Ogawa P.C.

(57) ABSTRACT

A method and structure for equalization in coherent optical receivers. Block-based LMS (BLMS) algorithm is one of the many efficient adaptive equalization algorithms used to (i) increase convergence speed and (ii) reduce implementation complexity. Since the computation of the equalizer output and the gradient of the error are obtained using a linear convolution, BLMS can be efficiently implemented in the frequency domain with the constrained frequency-domain BLMS (FBLMS) adaptive algorithm. The present invention introduces a novel reduced complexity constrained FBLMS algorithm. This new approach replaces the two discrete Fourier transform (DFT) stages required to evaluate the DFT of the gradient error, by a simple frequency domain filtering. Implementation complexity can be drastically reduced in comparison to the standard constrained FBLMS. Furthermore, the new approach achieves better performance than that obtained with the unconstrained FBLMS in ultra-high speed coherent optical receivers.

20 Claims, 4 Drawing Sheets

Related U.S. Application Data

(60) Provisional application No. 62/412,052, filed on Oct. 24, 2016, provisional application No. 62/412,071, filed on Oct. 24, 2016, provisional application No. 62/412,033, filed on Oct. 24, 2016, provisional application No. 62/412,047, filed on Oct. 24, 2016, provisional application No. 62/412,015, filed on Oct. 24, 2016, provisional application No. 62/412,002, filed on Oct. 24, 2016, provisional application No. 62/412,039, filed on Oct. 24, 2016.

(51) Int. Cl.
*H04L 7/00* (2006.01)
*H04L 27/26* (2006.01)
*H04B 10/079* (2013.01)
*H04L 1/00* (2006.01)
*H04B 10/40* (2013.01)

(52) U.S. Cl.
CPC ....... *H04B 10/616* (2013.01); *H04B 10/6161* (2013.01); *H04B 10/6165* (2013.01); *H04L 1/0045* (2013.01); *H04L 7/0075* (2013.01); *H04L 25/03019* (2013.01); *H04L 25/03159* (2013.01); *H04L 27/2662* (2013.01); *H04L 27/2697* (2013.01); *H04B 10/40* (2013.01); *H04L 27/2634* (2013.01)

(56) References Cited

U.S. PATENT DOCUMENTS

| | | | |
|---|---|---|---|
| 7,693,214 B2 | 4/2010 | Shida | |
| 7,894,728 B1 | 2/2011 | Sun et al. | |
| 8,244,142 B2 | 8/2012 | Wagner et al. | |
| 8,565,621 B2 | 10/2013 | Ibragimov et al. | |
| 8,634,726 B2 | 1/2014 | Zhang et al. | |
| 8,655,191 B2 | 2/2014 | Kaneda et al. | |
| 8,687,974 B2 | 4/2014 | Zelensky et al. | |
| 8,712,247 B2 | 4/2014 | Hauske | |
| 8,731,413 B1 | 5/2014 | Dave et al. | |
| 8,873,358 B2 | 10/2014 | Saito et al. | |
| 9,537,578 B2 * | 1/2017 | Sadot | H04B 10/616 |
| 9,673,910 B1 * | 6/2017 | Crivelli | H04B 10/6162 |
| 2006/0013590 A1 | 1/2006 | Hueda et al. | |
| 2007/0206963 A1 | 9/2007 | Koc | |
| 2008/0175590 A1 | 7/2008 | Perkins et al. | |
| 2009/0252497 A1 | 10/2009 | Younce et al. | |
| 2010/0329677 A1 | 12/2010 | Kaneda et al. | |
| 2011/0064421 A1 | 3/2011 | Zhang et al. | |
| 2011/0150506 A1 | 6/2011 | Tanimura et al. | |
| 2011/0229127 A1 | 9/2011 | Sakamoto et al. | |
| 2011/0268459 A1 | 11/2011 | Rollins et al. | |
| 2012/0096061 A1 | 4/2012 | Hauske | |
| 2012/0177156 A1 | 7/2012 | Hauske et al. | |
| 2012/0213510 A1 | 8/2012 | Stojanovic | |
| 2012/0219302 A1 | 8/2012 | Sun et al. | |
| 2012/0257652 A1 | 10/2012 | Malipatil et al. | |
| 2012/0269513 A1 | 10/2012 | Abe | |
| 2012/0288275 A1 | 11/2012 | Zhang et al. | |
| 2013/0039665 A1 | 2/2013 | Hauske | |
| 2013/0084080 A1 | 4/2013 | Shibutani | |
| 2013/0209089 A1 | 8/2013 | Harley et al. | |
| 2013/0243127 A1 | 9/2013 | Chmelar et al. | |
| 2013/0251082 A1 | 9/2013 | Abe | |
| 2013/0259490 A1 | 10/2013 | Malouin et al. | |
| 2013/0336647 A1 | 12/2013 | Le Taillandier De Gabory et al. | |
| 2013/0343490 A1 | 12/2013 | Wertz et al. | |
| 2014/0161470 A1 | 6/2014 | Zelensky et al. | |
| 2014/0254644 A1 | 9/2014 | Gotman et al. | |

OTHER PUBLICATIONS

Oscar E. Agazzi et al., "Maximum-Likelihood Sequence Estimation in Dispersive Optical Channels", Journal of Lightwave Technology, Feb. 2005, pp. 749-763, vol. 23, No. 2, IEEE.

Oscar Agazzi et al., "Timing Recovery in Digital Subscriber Loops," IEEE Transactions on Communications, Jun. 1985, p. 558-569, vol. COM-33, No. 6, IEEE.

Diego E. Crivelli et al., "Adaptive Digital Equalization in the Presence of Chromatic Dispersion, PMD, and Phase Noise in Coherent Fiber Optic Systems", IEEE 2004 Global Telecommunications Conference, Nov. 29-Dec. 3, 2004, p. 2545-2551, vol. 4, IEEE.

M. Kuschnerov et al., "DSP for Coherent Siingle-Carrier Receivers", Journal of Lightwave Technology, Aug. 15, 2009, p. 3614-3622, vol. 27, No. 16, IEEE.

David G. Messerschmitt, "Frequency Detectors for PLL Acquisition in Timing and Carrier Recovery", IEEE Transactions on Communications, Sep. 1979, p. 1288-1295, vol. COM-27, No. 9, IEEE.

Timo Pfau et al., "Hardware-Efficient Coherent Digital Receiver Concept with Feedforward Carrier Recovery for M-QAM Constellations", Journal of Lightwave Technology, Apr. 15, 2009, pp. 989-999, vol. 27, No. 8, IEEE.

Xiaofu Wu et al., "Iterative Carrier Recovery in Turbo Receivers with Distributed Pilots", IEEE International Conference on Consumer Electronics, Communications and Networks (CECNet), Apr. 2011, pp. 5024-5026, IEEE.

H. Zhang et al., "Cycle Slip Mitigation in POLMUX-QPSK Modulation", Optical Fiber Communication Conference and Exposition (OFC/NFOEC), 2011 and the National Fiber Optic Engineers Conference, Mar. 2011, pp. 1-3, Optical Society of America.

Shaoliang Zhang et al., "Pilot-Assisted Decision-Aided Maximum-Likelihood Phase Estimation in Coherent Optical Phase-Modulated Systems with Nonlinear Phase Noise", IEEE Photonics Technology Letters, Mar. 15, 2010, pp. 380-382, vol. 22, No. 6, IEEE.

Manar El-Chammas et al., "A 12-GS/s 81-mW 5-bit Time-Interleaved Flash ADC With Background Timing Skew Calibration", IEEE Journal Solid-State Circuits, Apr. 2011, pp. 838-847, vol. 46, No. 4, IEEE.

J. C. Geyer et al., "Optical Performance Monitoring using a 43Gb/s Realtime Coherent Receiver (Invited)", 2009, pp. 93-94, IEEE.

J.C. Geyer et al., "Performance Monitoring Using Coherent Receivers", 2009, pp. 1-3, IEEE.

Yuriy M Greshishchev et al., "A 40GS/s 6b ADC in 65nm CMOS", IEEE International Solid-State Circuits Conference, Feb. 10, 2010, pp. 390-392, IEEE.

Fabian N. Hauske et al., "Optical Performance Monitoring in Digital Coherent Receivers", Journal of Lightwave Technology, Aug. 15, 2009, pp. 3623-3631, vol. 27, No. 16, IEEE.

Andreas Leven et al., "Real-Time Implementation of Digital Signal Processing for Coherent Optical Digital Communication Systems", IEEE Journal of Selected Topics in Quantum Electronics, Sep./Oct. 2010, pp. 1227-1234, vol. 16, No. 5, IEEE.

L. E. Nelson et al., "Performance of 46-Gbps Dual-Polarization QPSK Transceiver With Real-Time Coherent Equalization Over High PMD Fiber", Journal of Lightwave Technology, Feb. 1, 2009, p. 158-167, vol. 27, No. 3, IEEE.

Andrew J. Viterbi et al., "Nonlinear Estimation of PSK-Modulated Carrier Phase with Application to Burst Digital Transmission", IEEE Transactions on Information Theory, Jul. 1983, pp. 543-551, vol. 29, No. 4, IEEE.

\* cited by examiner

REDUCED COMPLEXITY CONSTRAINED FREQUENCY-DOMAIN BLOCK LMS ADAPTIVE EQUALIZATION FOR COHERENT OPTICAL RECEIVERS

CROSS-REFERENCES TO RELATED APPLICATIONS

This application claims priority to and is a continuation of U.S. application Ser. No. 15/792,416, filed on Oct. 24, 2017, and claims priority to an incorporates by reference, for all purposes, the following U.S. provisional patent applications: U.S. Provisional App. No. 62/412,052, filed on Oct. 24, 2016; U.S. Provisional App. No. 62/412,071, filed on Oct. 24, 2016; U.S. Provisional App. No. 62/412,033, filed on Oct. 24, 2016; U.S. Provisional App. No. 62/412,047, filed on Oct. 24, 2016; U.S. Provisional App. No. 62/412,015, filed on Oct. 24, 2016; U.S. Provisional App. No. 62/412,002, filed on Oct. 24, 2016; and U.S. Provisional App. No. 62/412,039, filed on Oct. 24, 2016. The present application also incorporates by reference, for all purposes, the following U.S. Patents: U.S. Pat. No. 9,337,934, filed on Nov. 29, 2013, and issued on May 10, 2016; U.S. Pat. No. 9,178,625, filed on Dec. 3, 2013, and issued on Nov. 3, 2015; and U.S. Pat. No. 9,077,572, filed on Jan. 17, 2013, and issued on Jul. 7, 2015.

BACKGROUND OF THE INVENTION

The present invention relates to communication systems and integrated circuit (IC) devices. More particularly, the present invention provides for improved methods and devices for optical communication.

Over the last few decades, the use of communication networks exploded. In the early days Internet, popular applications were limited to emails, bulletin board, and mostly informational and text-based web page surfing, and the amount of data transferred was usually relatively small. Today, Internet and mobile applications demand a huge amount of bandwidth for transferring photo, video, music, and other multimedia files. For example, a social network like Facebook processes more than 500 TB of data daily. With such high demands on data and data transfer, existing data communication systems need to be improved to address these needs.

Optical communication is one major technological area that is growing to address these high demands on data. Optical communication systems typically communicate data over a plurality of channels corresponding to different phases and/or polarizations of the optical signal. While the data communicated over the different channels is typically aligned relative to a common clock when transmitted by the transmitter, delay (or skew) may be introduced into one or more of the channels based on characteristics of the transmitter, receiver, and/or the optical fiber. As a result, the relative timing of the data in the various channels may be misaligned at the receiver, causing degradation of the recovered data.

Although there are several types of devices and methods related to optical communication systems, they have been inadequate for the advancement of various applications. Conventional embodiments consume large areas or large amounts of power and suffer from performance limitations. Therefore, improved devices and methods for optical communication systems and related electronics are highly desired.

BRIEF SUMMARY OF THE INVENTION

The present invention relates to communication systems and integrated circuit (IC) devices. More particularly, the present invention provides for improved methods and devices for optical communication.

The present invention provides a method and structure for equalization in coherent optical receivers. Block-based LMS (BLMS) algorithm is one of the many efficient adaptive equalization algorithms used to (i) increase convergence speed and (ii) reduce implementation complexity. Since the computation of the equalizer output and the gradient of the error are obtained using a linear convolution, BLMS can be efficiently implemented in the frequency domain with the constrained frequency-domain BLMS (FBLMS) adaptive algorithm.

In an example, the present invention provides a coherent optical receiver device. This device can include an input signal; a first fast Fourier transform (FFT) module receiving the input signal, the first FFT module being configured to compute a first discrete Fourier transform (DFT) of the input signal; a chromatic dispersion (CD) equalizer module coupled to the first FFT module, the CD equalizer module being configured to compensate for CD affecting the input signal; a polarization mode dispersion (PMD) equalizer module coupled to the CD equalizer and a constrained frequency-domain block least means square (CFBLMS) module, the PMD equalizer module being configured to compensate for PMD affecting the input signal following compensation by the CD equalizer module.

In an example, the device can also include an inverse FFT (IFFT) module coupled to the PMD equalizer module, the IFFT module being configured to compute an inverse DFT of the input signal; a slicer and error evaluation module coupled to the IFFT module, the slicer and error evaluation module being configured to derive a data stream from the input signal. The slicer and the error evaluation can be separate modules, the slicer module being configured to derive the data stream, while the error evaluation module is configured to retime the input signal. The device can include a zero padding module coupled to the slicer and error evaluation module, the zero padding module being configured to increase a sampling rate of the input signal; and a second FFT module coupled to the zero padding module, the second FFT module being configured to compute a second DFT of the input signal.

In an example, the CFBLMS module is coupled to the second FFT module, the CD equalizer module, and the PMD equalizer module. The CFBLMS module outputs to the PMD equalizer module. In a specific example, the CFBLMS module is configured to filter the input signal according to the following equation:

$$C((n+1)N) = C(nN) - \beta U(nN)$$

where N refers to an N-dimensional vector of time-domain (TD) equalizer taps,
where $C(nN)$ is the DFT of an output from the CD equalizer module,
where $\beta$ is a step-size,
where $U(nN)$=First 2N elements of the circular convolution of W and $[R^*(nN)E(nN)]$,
where W is a frequency domain window;
where $R^*(nN)$ is the DFT of the input signal, and
where $E(nN)$ is the DFT of an error of the input signal.

In an example, the present invention provides a method of operating a coherent optical receiver device. The method can include providing an input signal; computing, by a first fast Fourier transform (FFT) module receiving the input signal, a first discrete Fourier transform (DFT) of the input signal; and compensating, by a chromatic dispersion (CD) equalizer module coupled to the first FFT module, for CD affecting the input signal. The method can further include compensating, by a polarization mode dispersion (PMD) equalizer module coupled to the CD equalizer module, for PMD affecting the input signal following the compensation by the CD equalizer module. The PMD module is also coupled to a constrained frequency-domain block least means square (CFBLMS) module.

In an example, the method also includes computing, by an inverse FFT (IFFT) module coupled to the PMD equalizer module, an inverse DFT of the input signal; and deriving, by a slicer and error evaluation module coupled to the IFFT module, a data stream from the input signal. More specifically, the method can include deriving the data stream by a slicer module, while the method also includes retiming, by the error evaluation module, the input signal. The method can include increasing, by a zero padding module coupled to the slicer and error evaluation module, a sampling rate of the input signal; and computing, by a second FFT module coupled to the zero padding module, a second DFT of the input signal.

In an example, the method includes filtering, by the CFBLMS module coupled to the CD equalizer module and the second FFT module and the PMD equalizer module, the input signal. In a specific example, the filtering by the CFBLMS module being characterized by the following equation:

$$C((n+1)N)=C(nN)-\beta U(nN)$$

where N refers to an N-dimensional vector of time-domain (TD) equalizer taps,
where $C(nN)$ is the DFT of an output from the CD equalizer module,
where $\beta$ is a step-size,
where $U(nN)$=First 2N elements of the circular convolution of W and $[R^*(nN)E(nN)]$,
where W is a frequency domain window,
where $R^*(nN)$ is the DFT of the input signal, and
where $E(nN)$ is the DFT of an error of the input signal.

The present invention introduces a novel reduced complexity constrained FBLMS algorithm. This new approach replaces the two discrete Fourier transform (DFT) stages required to evaluate the DFT of the gradient error, by a simple frequency domain filtering. Implementation complexity can be drastically reduced in comparison to the standard constrained FBLMS. Furthermore, the new approach achieves better performance than that obtained with the unconstrained FBLMS in ultra-high speed coherent optical receivers. Those of ordinary skill in the art will recognize other variations, modifications, and alternatives.

A further understanding of the nature and advantages of the invention may be realized by reference to the latter portions of the specification and attached drawings.

BRIEF DESCRIPTION OF THE DRAWINGS

In order to more fully understand the present invention, reference is made to the accompanying drawings. Understanding that these drawings are not to be considered limitations in the scope of the invention the presently described embodiments and the presently understood best mode of the invention are described with additional detail through the use of the accompanying drawings in which.

DETAILED DESCRIPTION OF THE INVENTION

Figure 1:
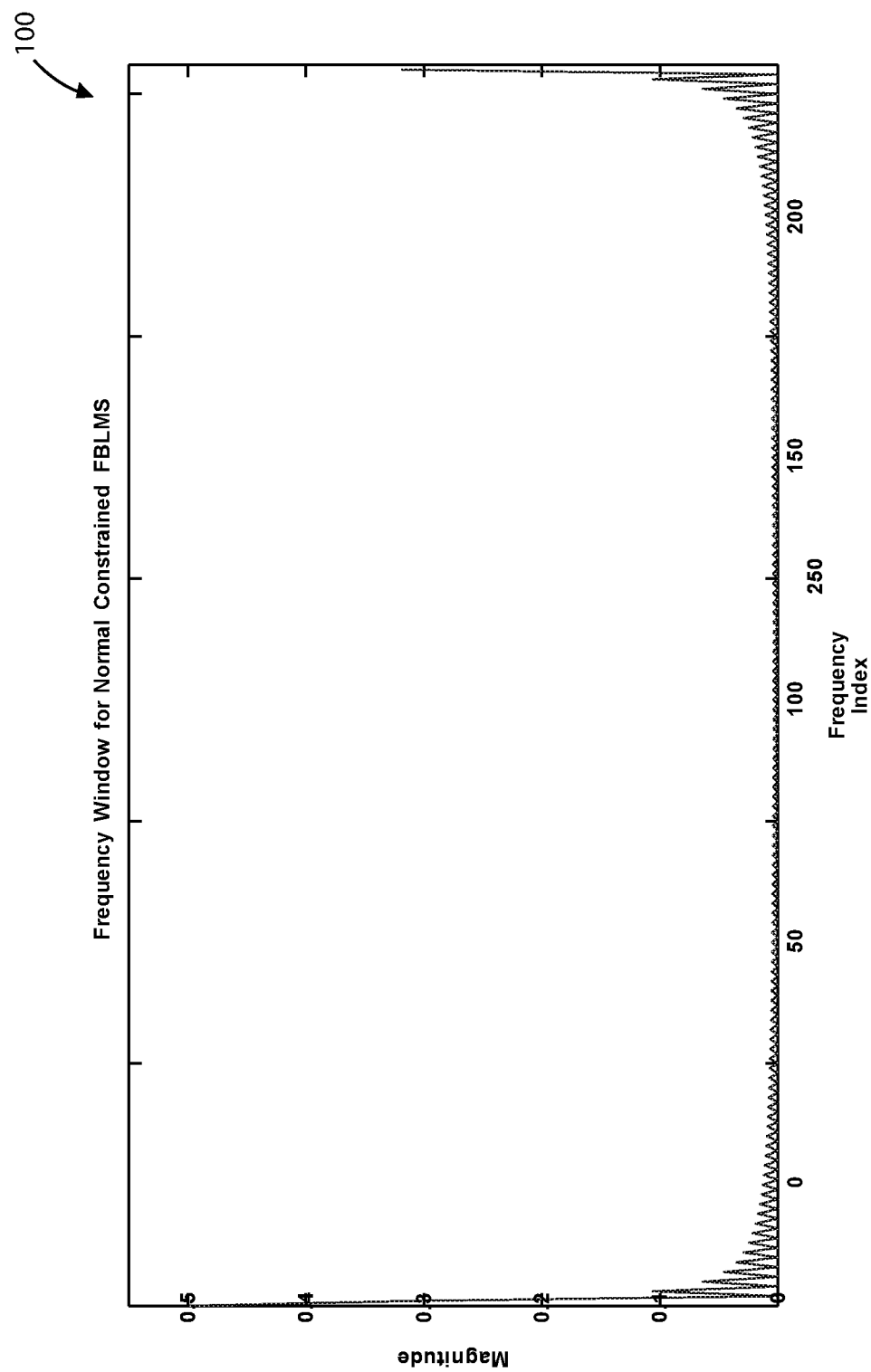
FIG. 1 is a simplified diagram illustrating a magnitude of a frequency domain window according to an example of the present invention.

The present invention relates to communication systems and integrated circuit (IC) devices. More particularly, the present invention provides for improved methods and devices for optical communication.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

I. Adaptive Block LMS Equalization

In an adaptive block least mean-square (LMS) equalizer, the updating of filter taps occurs once for every block of samples. The block estimates the filter taps, or coefficients, needed to minimize the error between the output signal and the desired signal in a coherent optical receiver. The following computations are considered in various examples of the present invention.

Let c(nN) be an N-dimensional vector of the time-domain (TD) equalizer taps at instant nN defined as follows:

$$c(nN)=[c_{nN}^{(0)},c_{nN}^{(1)},\ldots,c_{nN}^{(N-1)}]^T. \quad (1)$$

Also, r(k) is defined as the N-dimensional vector with the input samples as follows:

$$r(k)=[r(k),r(k-1),\ldots,r(k-N+1)]^T. \quad (2)$$

The filter output at instant nN+i is as follows:

$$y(nN+i)=c^T(nN)r(nN+i), i=0,1,\ldots,N-1. \quad (3)$$

while the error signal at instant nN+i results in the following:

$$e(nN+i)=d(nN+i)-y(nN+i), i=0,1,\ldots,N-1. \quad (4)$$

The equation for updating the coefficients according to the block LMS algorithm is given by the following:

$$c((n+1)N) = c(nN) - \beta \sum_{i=0}^{N-1} e(nN+i)r^*(nN+i) \quad (5)$$

$$= c(nN) - \beta \nabla_{nN} \quad (6)$$

where β is the step-size and $\nabla_{nN}$ denotes the estimate of the gradient vector at instant nN. The m-th component of the gradient vector $\nabla_{nN}$ can be expressed as follows:

$$|\nabla_{nN}|_m = \left[\sum_{i=0}^{N-1} e(nN+i)r^*(nN+i)\right]_m \quad m=0,1,\ldots,N-1 \quad (7)$$

$$= \sum_{i=0}^{N-1} e(nN+i)r^*(nN+i-m) \quad (8)$$

therefore it can be evaluated as the convolution of e(k) and r*(-k).

B. Frequency-Domain BLMS Adaptation

Without loss of generality, it can be assumed that the filtering is implemented in the frequency-domain (FD) by the overlap-save technique with a 50% overlap. The Discrete Fourier Transform (DFT) of the input signal can be expressed as a 2N×2N diagonal matrix R(nN) given by the following:

$$\text{diag}\{R(nN)\} = DFT[r(nN-N),\ldots, \quad (9)$$
$$r(nN-1),r(nN),r(nN+1),\ldots,r(nN+N-1)]$$

where r(nN−N), . . . , r(nN−1) refers to block n−1 and r(nN), r(nN+1), . . . , r(nN+N−1) refers to block n; the DFT being across 2N,
while the DFT of the equalizer response is as follows:

$$C(nN) = DFT\begin{bmatrix} c(nN) \\ 0_N \end{bmatrix}, \quad (10)$$

where $0_N=[0,0,0,\ldots,0]^T$. Thus, the equalized block output results as follows:

$$y(nN)=\text{Last } N \text{ elements of } DFT^{-1}[R(nN)C(nN)]. \quad (11)$$

The DFT of the error is defined as follows:

$$E(nN)=DFT[0_N, e(nN), e(nN+1),\ldots, e(nN+N-1)]^T, \quad (12)$$

where $0_N$ refers to N zeros; e (nN), e (nN+1), . . . , e (nN+N−1) refers to N errors in block n; the DFT being across 2N.

Here, the N-dimensional gradient can be obtained as follows:

$$\nabla_{nN}=\text{First } N \text{ elements of } DFT^{-1}[R^*(nN)C(nN)]. \quad (13)$$

The equation for updating the coefficients according to the BLMS algorithm in the FD is as follows:

$$C((n+1)N) = C(nN) - \beta DFT \begin{bmatrix} \nabla_{nN} \\ 0_N \end{bmatrix} \quad (14)$$

where $\nabla_{nN}$ is given by (13) and where C(nN) is as follows:

$$C(nN) = DFT \begin{bmatrix} c(nN) \\ 0_N \end{bmatrix} \quad (15)$$

Here, expression (14) is called the constrained FBLMS adaptive algorithm (CFBLMS).

In order to further reduce the implementation complexity of a coherent optical receiver, an unconstrained FBLMS (UFLBMS) adaptive filter can be used, which applies the following algorithm:

$$C((n+1)N)=C(nN)-\beta R^*(nN)E(nN). \quad (16)$$

Compared to the CFBLMS algorithm, the unconstrained adaptive equalizer does not require the implementation of two DFT stages.

C. CFBLMS vs. UFBLMS

CFBLMS and UFBLMS algorithms have the same optimum solution when the filter length is equal to or greater than the channel memory. On the other hand, UFBLMS has a lower convergence rate and smaller stable range of step-size than that of the constrained algorithm. In the presence of time variations of the channel where large step-size would be required, this limitation of UFBLMS may degrade the receiver performance. The latter problem is exacerbated in practical implementation as a result of the latency in the adaptation loop.

II. Reduced Complexity Constrained FBLMS

A. Frequency-Domain Implementation of the Gradient Constraint

According to an example of the present invention, reducing the complexity of implementing the CFBLMS algorithm in a coherent optical receiver allows for the performance benefits discussed previously while avoiding the degradation problems from implementing the UFBLMS algorithm. The constrained FBLMS can be implemented in the FD as follows:

$$C((n+1)N)=C(nN)-\beta U(nN) \quad (17)$$

where U(nN) is as follows:

$$U(nN)=\text{First } 2N \text{ elements of } [R^*(nN)E(nN)]\oplus W \quad (18)$$

with ⊕ denoting circular convolution and W being the DFT of the 2N-dimensional vector given by the following:

$$w=[1,1,1,\ldots 1 0,0,0,\ldots 0]^T. \quad (19)$$

From this, the k-th component of W is given by the following:

$$|W|_k = \begin{cases} \dfrac{1}{2} & \text{if } k = 0 \\ \dfrac{1}{N} e^{-j\frac{\pi}{2}k} e^{j\frac{\pi}{N}k} \dfrac{\sin\left(\dfrac{\pi k}{2}\right)}{\sin\left(\dfrac{\pi k}{N}\right)} & \text{if } k = 1, 2, \ldots, 2N-1 \end{cases} \quad (20)$$

FIG. 1 is a simplified diagram illustrating a magnitude of a frequency domain window according to an example of the present invention. More specifically, graph 100 shows the magnitude of the FD window W given by (20) for N=128. The number of non-null components is N+1 (i.e., 129), therefore the implementation complexity of the frequency domain CFBLMS (17) is higher than that based on the DFT and $DFT^1$ as defined by (13) and (14). Therefore, the application of the constrained FBLMS (14) or (17) in low power transceivers is still prohibitive.

B. Reduced Complexity Constrained FBLMS

The application of the constrained FBLMS algorithm in low power optical coherent transceivers is limited as a result of its high complexity. However, in certain applications it is possible to combat this problem by using the FD implementation of the gradient constraint with a different FD window W. For example two possible FD windows are as follows:

$$W_2 = \frac{1}{2}[1, -j0.5, 0, 0, 0, \ldots, 0, j0.5]^T, \quad (21)$$

$$W_4 = \frac{1}{4}[1, -j0.75, -0.5, j-0.25, 0, 0, \ldots, 0, -j0.25, -0.5, j0.75]^T. \quad (22)$$

Figure 2:
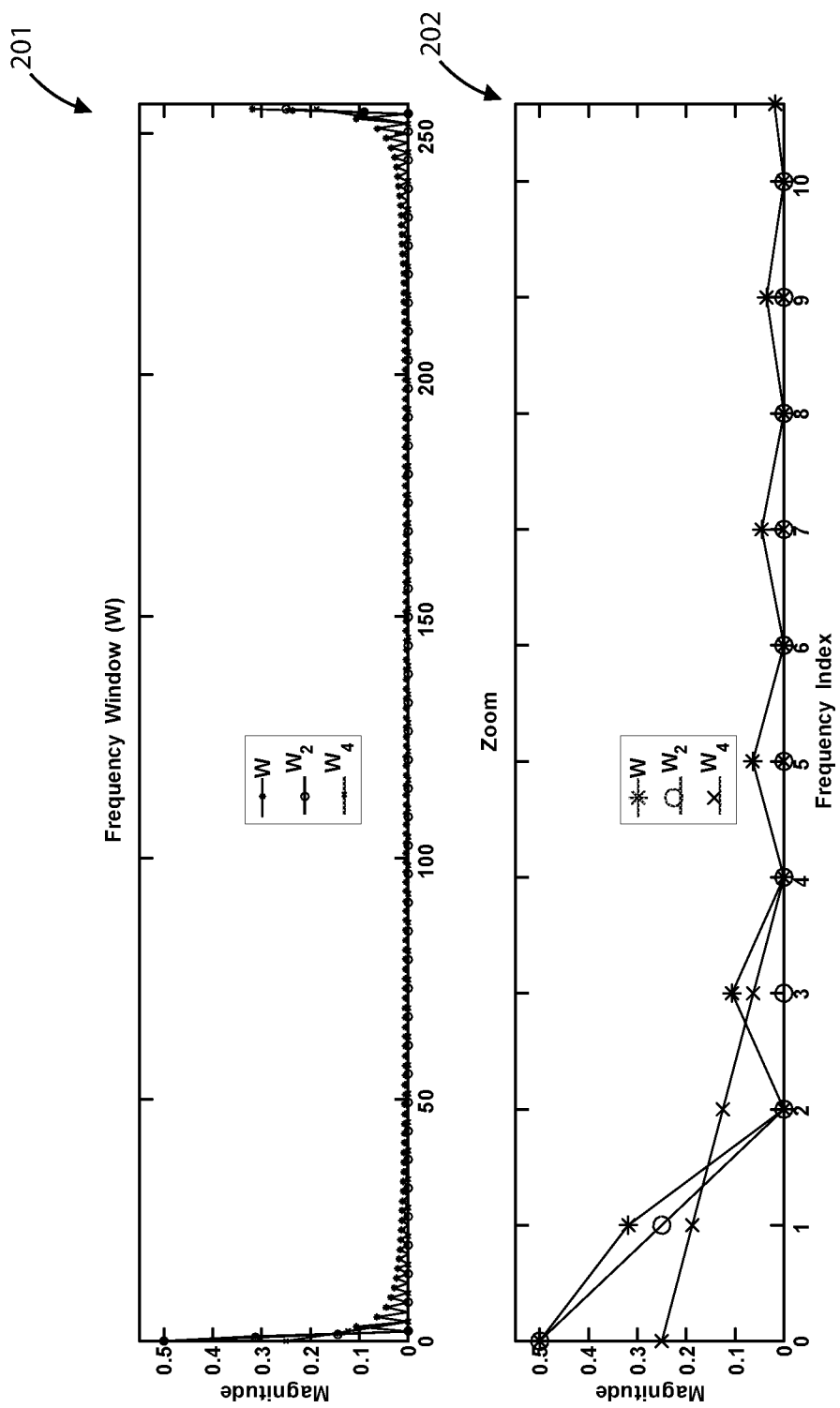
FIG. 2 is a simplified graph illustrating magnitudes of frequency domain windows according to examples of the present invention.
Figure 3:
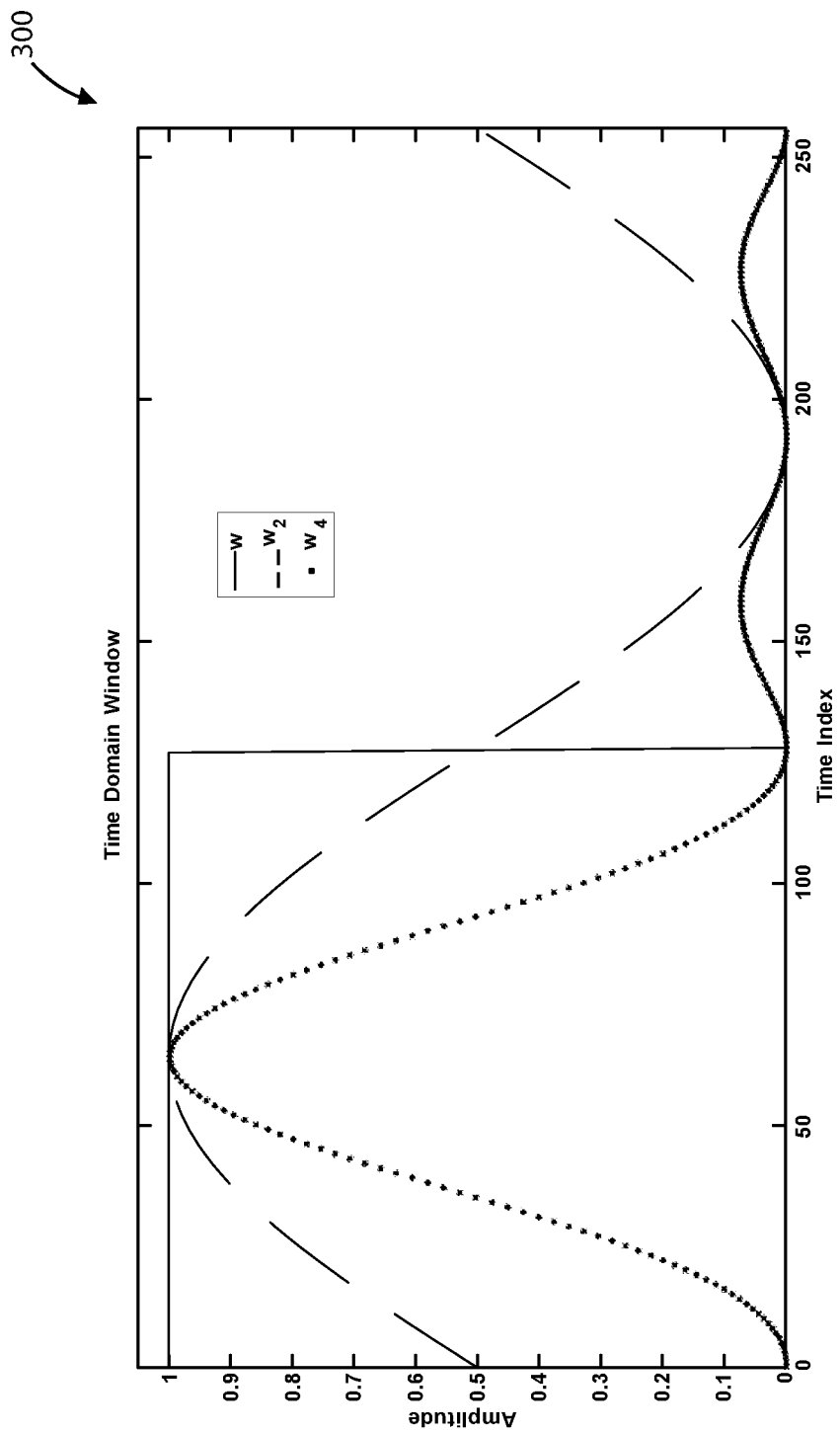
FIG. 3 is a simplified graph illustrating amplitudes of time domain windows according to examples of the present invention.

FIGS. 2 and 3 depict the corresponding frequency and time domain windows. FIG. 2 includes simplified graph 201, which shows the magnitude of the frequency domain windows W, $W_2$, and $W_4$ for N=128. Graph 202 shows a close-up view of graph 201. FIG. 3 shows a simplified graph 300 with the amplitude of the time domain windows w, $w_2$, and $w_4$ for N=128.

The frequency domain taps $W_2$ and $W_4$ are real or imaginary and the number of them is small (i.e., 3 and 7 for $W_2$ and $W_4$, respectively). Furthermore, the non-null components of (21) and (22) can be expressed as $2^{-a}$ or $2^{-a}+2^{-b}$, which simplifies the implementation of the multiplications. Therefore, the complexity can be drastically reduced with the frequency domain implementation of the gradient constraint (17). Here, the benefit is obtained at the expense of a reduction of the effective number of equalizer taps.

III. Application in Coherent Optical Receivers

Chromatic dispersion (CD) and polarization mode dispersion (PMD) are two of the most important impairments experienced in optic fiber channels. In optical coherent transceivers, CD is usually compensated by using a non-adaptive FD equalizer, while PMD is mitigated with a TD adaptive equalizer. For example, in regional and metropolitan optical links (i.e., ≤400 km), CD represents around 90 taps for a 4/3-oversampled receiver at a 32 GBd baud rate. This requires an FD equalizer with a 256-point FFT and 50% overlap. On the other hand, a TD adaptive MIMO-equalizer with ≤20 taps are required to compensate the expected PMD.

A. Architecture of a Reduced Complexity CFBLMS-Based Receiver

According to an example of the present invention, the FBLMS adaptive algorithm can be used to implement the PMD equalizer. However, the cascade of two FD equalizers with different block sizes to compensate CD and PMD, requires frequency-time-frequency transformations (i.e., the architecture is not efficient). Therefore, it is desirable to compensate CD and PMD in the same stage, i.e., without the intermediate transformation to the TD.

Figure 4:
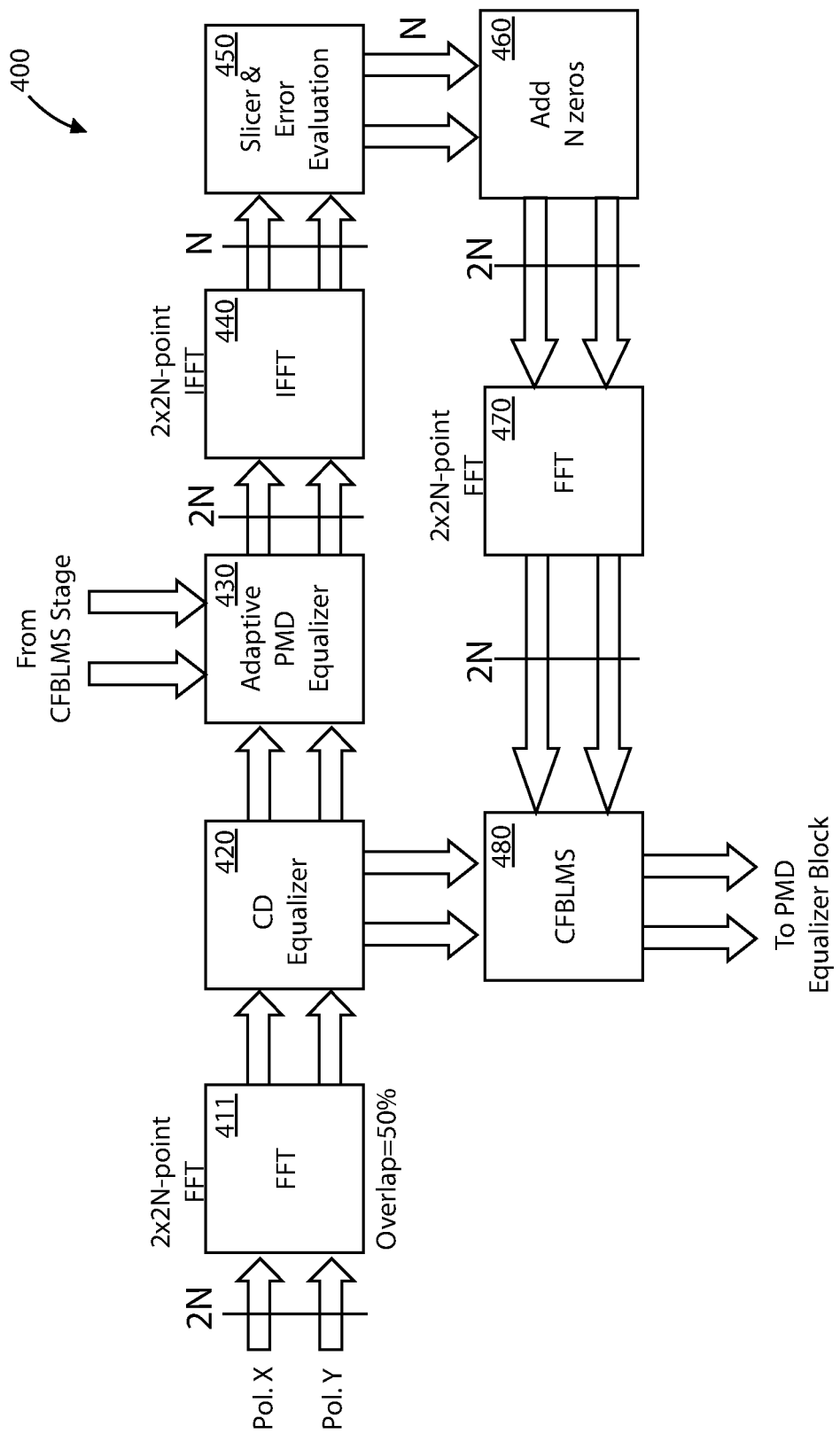
FIG. 4 is a simplified block diagram illustrating a coherent optical receiver according to an example of the present invention.

Taking into account the nature of the CD and PMD responses, the reduced complexity constrained FBLMS can be adopted as depicted in FIG. 4, which illustrates a coherent optical receiver according to an example of the present invention. As shown, device 400 can include an input signal; a first fast Fourier transform (FFT) module receiving the input signal, the first FFT module 411 being configured to compute a first discrete Fourier transform (DFT) of the input signal; a chromatic dispersion (CD) equalizer module 420 coupled to the first FFT module 411, the CD equalizer module 420 being configured to compensate for CD affecting the input signal; a polarization mode dispersion (PMD) equalizer module 430 coupled to the CD equalizer and a constrained frequency-domain block least means square (CFBLMS) module 480, the PMD equalizer module 430 being configured to compensate for PMD affecting the input signal following compensation by the CD equalizer module.

In an example, the device can also include an inverse FFT (IFFT) module 440 coupled to the PMD equalizer module 430, the IFFT module being configured to compute an inverse DFT of the input signal; a slicer and error evaluation module 450 coupled to the IFFT module 440, the slicer and error evaluation module 450 being configured to derive a data stream from the input signal. The slicer and the error evaluation can be separate modules, the slicer module being configured to derive the data stream, while the error evaluation module is configured to retime the input signal. The device can include a zero padding module 460 coupled to the slicer and error evaluation module 450, the zero padding module 460 being configured to increase a sampling rate of the input signal; and a second FFT module 470 coupled to the zero padding module 460, the second FFT module 470 being configured to compute a second DFT of the input signal. Those of ordinary skill in the art will recognize other variations, modifications, and alternatives.

In an example, the CFBLMS module 480 is coupled to the second FFT module 470, the CD equalizer module 420, and the PMD equalizer module 430. The CFBLMS module 480 outputs to the PMD equalizer module 430. In a specific example, the CFBLMS module 480 is configured to filter the input signal according to the following equation:

$$C((n+1)N) = C(nN) - \beta U(nN)$$

where N refers to an N-dimensional vector of time-domain (TD) equalizer taps, where C(nN) is the DFT of an output from the CD equalizer module, where β is a step-size, where U(nN)=First 2N elements of the circular convolution of W and [R*(nN)E(nN)], where W is a frequency domain window;

where R*(nN) is the DFT of the input signal, and where E(nN) is the DFT of an error of the input signal.

According to an example, CD is first compensated; therefore the residual dispersion at the input of the PMD equalizer is mainly caused by PMD. This way, the CFBLMS with FD windows such as those defined by (21) or (22) can be used with similar or even better performance compared to the standard constrained algorithm obtained with (20). This performance improvement is achieved as a result of the reduction of the effective taps number obtained with the proposed FD windows, thus the excess mean-squared error (MSE) introduced by the coefficients adaptation is reduced.

In an example, the present invention provides a method of operating a coherent optical receiver device. The method can include providing an input signal; computing, by a first fast Fourier transform (FFT) module receiving the input signal, a first discrete Fourier transform (DFT) of the input signal; and compensating, by a chromatic dispersion (CD) equalizer module coupled to the first FFT module, for CD affecting the input signal. The method can further include compensating, by a polarization mode dispersion (PMD) equalizer module coupled to the CD equalizer module, for PMD affecting the input signal following the compensation by the CD equalizer module. The PMD module is also coupled to a constrained frequency-domain block least means square (CFBLMS) module.

In an example, the method also includes computing, by an inverse FFT (IFFT) module coupled to the PMD equalizer module, an inverse DFT of the input signal; and deriving, by a slicer and error evaluation module coupled to the IFFT module, a data stream from the input signal. More specifically, the method can include deriving the data stream by a slicer module, while the method also includes retiming, by the error evaluation module, the input signal. The method can include increasing, by a zero padding module coupled to the slicer and error evaluation module, a sampling rate of the input signal; and computing, by a second FFT module coupled to the zero padding module, a second DFT of the input signal.

In an example, the method includes filtering, by the CFBLMS module coupled to the CD equalizer module and the second FFT module and the PMD equalizer module, the input signal. In a specific example, the filtering by the CFBLMS module being characterized by the following equation:

$$C((n+1)N) = C(nN) - \beta U(nN)$$

where N refers to an N-dimensional vector of time-domain (TD) equalizer taps,
where C(nN) is the DFT of an output from the CD equalizer module,
where β is a step-size,
where U(nN)=First 2N elements of the circular convolution of W and [R*(nN)E(nN)],
where W is a frequency domain window,
where R*(nN) is the DFT of the input signal, and
where E(nN) is the DFT of an error of the input signal.

Although UFBLMS and the present CFBLMS algorithms avoid the implementation of several DFT stages, a high latency of the adaptation loop is still experienced. This high latency may degrade the performances since large step sizes are typically used to track time variations of the PMD. In this situation, the proposed CFBLMS will be able to achieve better performance compared to the UFBLMS.

B. Implementation of the Reduced Complexity CFBLMS-Based Receiver

The 2N-dimensional frequency-domain correlation vector can be defined as follows:

$$X_{se}(nN) = R^*(nN)E(nN). \tag{23}$$

Without loss of generality, the implementation of the frequency-domain taps given by (22) is considered. Then, the gradient vector U(nN) defined by (18) can be rewritten as follows:

$$U(nN) = \tfrac{1}{4}\overline{W}X_{se}(nN), \tag{24}$$

where $\overline{W}$ is the 2N×2N circular convolution matrix is defined by the following:

$$\begin{bmatrix} 1 & j0.75 & -0.5 & -j0.25 & 0 & \ldots & 0 & j0.25 & -0.5 & -j0.75 \\ -j0.75 & 1 & j0.75 & -0.5 & -j0.25 & \ldots & 0 & 0 & j0.25 & -0.5 \\ -0.5 & -j0.75 & 1 & j0.75 & -0.5 & \ldots & 0 & 0 & 0 & j0.25 \\ j0.25 & -0.5 & -j0.75 & 1 & j0.75 & \ldots & 0 & 0 & 0 & 0 \\ \vdots & \vdots & \vdots & \vdots & \vdots & \ddots & \vdots & \vdots & \vdots & \vdots \\ j0.75 & -0.5 & -j0.25 & 0 & 0 & \ldots & j0.25 & -0.5 & -j0.75 & 1 \end{bmatrix} \tag{25}$$

Then, the constrained FBLMS (17) reduces to the following:

$$C((n+1)N) = C(nN) - \frac{\beta}{4}\overline{W}X_{se}(nN). \tag{26}$$

In order to further reduce complexity, the frequency-domain correlation vector can be sub-sampled. For example, if a subsampling factor of 4 and filtering with 50% overlap are used, the constrained FBLMS (26) results in the following:

$$C((n+1)N) = C(nN) - \frac{\beta}{4}\hat{W}X_{se}(nN), \tag{27}$$

where $\hat{W}$ is defined as follows:

$$\hat{W} = \overline{W}L \tag{28}$$

with L being the 2N×2N rotated, linear interpolation matrix defined as follows:

$$L = \begin{bmatrix} 1 & 0 & 0 & 0 & 0 & 0 & 0 & 0 & 0 & \ldots \\ -j0.75 & 0 & 0 & 0 & -j0.25 & 0 & 0 & 0 & 0 & \ldots \\ -0.5 & 0 & 0 & 0 & -0.5 & 0 & 0 & 0 & 0 & \ldots \\ j0.25 & 0 & 0 & 0 & j0.75 & 0 & 0 & 0 & 0 & \ldots \\ 0 & 0 & 0 & 0 & 1 & 0 & 0 & 0 & 0 & \ldots \\ 0 & 0 & 0 & 0 & -j0.75 & 0 & 0 & 0 & -j0.25 & \ldots \\ 0 & 0 & 0 & 0 & -0.5 & 0 & 0 & 0 & -0.5 & \ldots \\ \vdots & \vdots & \vdots & \vdots & \vdots & \vdots & \vdots & \vdots & \vdots & \ddots \end{bmatrix} \tag{29}$$

Here, the matrix L includes a rotation of the interpolated samples by −j, −1, and j. The latter is required to provide a proper group delay to the equalizer response.

The present invention introduces a novel reduced complexity constrained FBLMS algorithm. This new approach replaces the two discrete Fourier transform (DFT) stages required to evaluate the DFT of the gradient error, by a simple frequency domain filtering. Implementation complexity can be drastically reduced in comparison to the standard constrained FBLMS. Furthermore, the new approach achieves better performance than that obtained with the unconstrained FBLMS in ultra-high speed coherent optical receivers. Those of ordinary skill in the art will recognize other variations, modifications, and alternatives While the above is a full description of the specific embodiments, various modifications, alternative constructions and equivalents may be used. Therefore, the above description and illustrations should not be taken as limiting the scope of the present invention which is defined by the appended claims.

What is claimed is:

1. A coherent optical receiver device, the device comprising:
    an input signal;
    a first signal processing circuit module receiving the input signal, the first signal processing circuit module being configured to compute a discrete Fourier transform (DFT) of the input signal;
    a chromatic dispersion (CD) equalizer circuit module coupled to the first signal processing module, the CD equalizer circuit module being configured to compensate for CD affecting the input signal;
    a polarization mode dispersion (PMD) equalizer circuit module coupled to the CD equalizer circuit module and a constrained frequency-domain block least means square (CFBLMS) circuit module, the PMD equalizer circuit module being configured to compensate for PMD affecting the input signal following compensation by the CD equalizer circuit module;
    a second signal processing circuit module coupled to the PMD equalizer circuit module, the second signal processing circuit module being configured to retime the input signal and compute a DFT of an error of the input signal;
    wherein the CFBLMS circuit module is coupled to the second signal processing circuit module, the CD equalizer circuit module, and the PMD equalizer circuit module;
    wherein the CFBLMS circuit module is configured to filter the input signal according to a CFBLMS algorithm that determines the difference between a DFT output of the CD equalizer circuit module and a circular convolution term, the circular convolution term being derived from the DFT of the input signal, the DFT of the error of the input signal, and a frequency domain window.

2. The device of claim 1 wherein the input signal is a dual-polarization input with an x-type polarization input and a y-type polarization input;
    wherein the CD equalizer circuit module includes a non-adaptive frequency-domain (FD) equalizer circuit, and wherein the PMD equalizer circuit module includes an adaptive FD equalizer circuit; and
    wherein the CFBLMS circuit module outputs to the PMD equalizer circuit module.

3. The device of claim 1 wherein the CFBLMS circuit module is configured to filter the input signal according to the following equation:

$$C((n+1)N) = C(nN) - \beta U(nN)$$

where N refers to an N-dimensional vector of time-domain (TD) equalizer taps,
where C(nN) is the DFT of an output from the CD equalizer circuit module,
where $\beta$ is a step-size,
where U(nN)=First 2N elements of the circular convolution of W and [R*(nN)E(nN)],
where W is the frequency domain window;
where R*(nN) is the DFT of the input signal, and
where E(nN) is the DFT of an error of the input signal.

4. The device of claim 1 wherein the CFBLMS circuit module is configured to filter the input signal according to the following equation:

$$C((n+1)N) = C(nN) - \frac{\beta}{4}\overline{W}X_{se}(nN)$$

where N refers to an N-dimensional vector of time-domain (TD) equalizer taps,
where C(nN) is the DFT of an output from the CD equalizer circuit module,
where $\beta$ is a step-size,
where W is the frequency domain window;
where $\overline{W}$ is a 2N×2N circular convolution matrix;
where $X_{se}(nN)=R^*(nN)E(nN)$
where R*(nN) is the DFT of the input signal, and
where E(nN) is the DFT of an error of the input signal.

5. The device of claim 4 wherein the CFBLMS circuit module is configured such that the 2N×2N circular convolution matrix $\overline{W}$ is defined by $$\begin{bmatrix} 1 & j0.75 & -0.5 & -j0.25 & 0 & \ldots & 0 & j0.25 & -0.5 & -j0.75 \\ -j0.75 & 1 & j0.75 & -0.5 & -j0.25 & \ldots & 0 & 0 & j0.25 & -0.5 \\ -0.5 & -j0.75 & 1 & j0.75 & -0.5 & \ldots & 0 & 0 & 0 & j0.25 \\ j0.25 & -0.5 & -j0.75 & 1 & j0.75 & \ldots & 0 & 0 & 0 & 0 \\ \vdots & \vdots & \vdots & \vdots & \vdots & \ddots & \vdots & \vdots & \vdots & \vdots \\ j0.75 & -0.5 & -j0.25 & 0 & 0 & \ldots & j0.25 & -0.5 & -j0.75 & 1 \end{bmatrix}.$$

6. The device of claim 4 wherein the CFBLMS circuit module is configured to subsample the frequency-domain (FD) correlation vector $X_{se}(nN)$.

7. The device of claim 1 wherein the CFBLMS circuit module is configured such that the frequency domain window W=½[1, –j0.5, 0, 0, 0, . . . , 0, j0.5]$^T$, this vector being 2N long.

8. The device of claim 1 wherein the CFBLMS circuit module is configured such that the frequency domain window W=¼[1, –j0.75, –0.5, j0.25, 0, 0, . . . , 0, –j0.25, –0.5, j0.75]$^T$, this vector being 2N long.

9. A method of operating a coherent optical receiver device, the method comprising:
    providing an input signal;
    computing, by a first signal processing circuit module receiving the input signal, a discrete Fourier transform (DFT) of the input signal;
    compensating, by a chromatic dispersion (CD) equalizer circuit module coupled to the first processing module, for CD affecting the input signal;
    compensating, by a polarization mode dispersion (PMD) equalizer circuit module coupled to the CD equalizer module and coupled to a constrained frequency-domain block least means square (CFBLMS) circuit module, for PMD affecting the input signal following the compensation by the CD equalizer module;

$$\begin{bmatrix} 1 & j0.75 & -0.5 & -j0.25 & 0 & \ldots & 0 & j0.25 & -0.5 & -j0.75 \\ -j0.75 & 1 & j0.75 & -0.5 & -j0.25 & \ldots & 0 & 0 & j0.25 & -0.5 \\ -0.5 & -j0.75 & 1 & j0.75 & -0.5 & \ldots & 0 & 0 & 0 & j0.25 \\ j0.25 & -0.5 & -j0.75 & 1 & j0.75 & \ldots & 0 & 0 & 0 & 0 \\ \vdots & \vdots & \vdots & \vdots & \vdots & \ddots & \vdots & \vdots & \vdots & \vdots \\ j0.75 & -0.5 & -j0.25 & 0 & 0 & \ldots & j0.25 & -0.5 & -j0.75 & 1 \end{bmatrix}.$$

retiming, by a second signal processing circuit module coupled to the PMD equalizer circuit module, the input signal;
computing, by the second signal processing circuit module, a DFT of an error of the input signal; and
filtering, by the CFBLMS circuit module coupled to the CD equalizer circuit module and the second signal processing circuit module and the PMD equalizer circuit module, the input signal according to a CFBLMS algorithm that determines the difference between a DFT output of the CD equalizer circuit module and a circular convolution term, the circular convolution term being derived from the DFT of the input signal, the DFT of the error of the input signal, and a frequency domain window.

10. The method of claim 9 wherein the input signal is a dual-polarization input with an x-type polarization input and a y-type polarization input;
wherein the compensation of CD and PMD occurs in the same stage; and
further comprising outputting, by the CFBLMS circuit module, to the PMD equalizer circuit module.

11. The method of claim 9 wherein the filtering of the input signal by the CFBLMS circuit module is according to the following equation:

$$C((n+1)N) = C(nN) - \beta U(nN)$$

where N refers to an N-dimensional vector of time-domain (TD) equalizer taps,
where $C(nN)$ is the DFT of an output from the CD equalizer circuit module,
where $\beta$ is a step-size,
where $U(nN)$=First 2N elements of the circular convolution of W and $[R^*(nN)E(nN)]$,
where W is the frequency domain window;
where $R^*(nN)$ is the DFT of the input signal, and
where $E(nN)$ is the DFT of an error of the input signal.

12. The method of claim 9 wherein the filtering of the input signal by the CFBLMS circuit module is according to the following equation:

$$C((n+1)N) = C(nN) - \frac{\beta}{4} \overline{W} X_{se}(nN)$$

where N refers to an N-dimensional vector of time-domain (TD) equalizer taps,
where $C(nN)$ is the DFT of an output from the CD equalizer circuit module,
where $\beta$ is a step-size,
where W is the frequency domain window;
where $\overline{W}$ is a 2N×2N circular convolution matrix;
where $X_{se}(nN) = R^*(nN)E(nN)$
where $R^*(nN)$ is the DFT of the input signal, and
where $E(nN)$ is the DFT of an error of the input signal.

13. The method of claim 12 wherein filtering by the CFBLMS circuit module is such that the 2N×2N circular convolution matrix $\overline{W}$ is defined by 14. The method of claim 12 wherein filtering by the CFBLMS circuit module includes subsampling the frequency-domain (FD) correlation vector $X_{se}(nN)$.

15. The method of claim 9 wherein the CFBLMS module is configured such that the frequency domain window $W = \frac{1}{2}[1, -j0.5, 0, 0, 0, \ldots, 0, j0.5]^T$, this vector being 2N long.

16. The method of claim 9 wherein the CFBLMS module is configured such that the frequency domain window $W = \frac{1}{4}[1, -j0.75, -0.5, j0.25, 0, 0, \ldots, 0, -j0.25, -0.5, j0.75]^T$, this vector being 2N long.

17. A method for adaptive signal equalization in a coherent digital signal processor using a constrained frequency-domain block least means square (CFBLMS) circuit module, the method comprising:
providing an input signal;
determining, by a first signal processing circuit module, a discrete Fourier transform (DFT) of the input signal;
compensating, by an equalizer circuit module, for chromatic dispersion (CD) and polarization mode dispersion (PMD) affecting the input signal;
computing, by the second signal processing circuit module, a DFT of an error of the input signal;
filtering, by the CFBLMS circuit module, the input signal according to a CFBLMS algorithm that determines the difference between a DFT output of the CD equalizer circuit module and a circular convolution term, the circular convolution term being derived from the DFT of the input signal, the DFT of the error of the input signal, and a frequency domain window; and
outputting, from the CFBLMS circuit module, the filtered input signal to the equalizer circuit module for adaptive equalization.

18. The method of claim 17 wherein the filtering of the input signal by the CFBLMS circuit module is according to the following equation:

$$C((n+1)N) = C(nN) - \beta U(nN)$$

where N refers to an N-dimensional vector of time-domain (TD) equalizer taps,
where $C(nN)$ is the DFT of an output from the equalizer circuit module,
where $\beta$ is a step-size,
where $U(nN)$=First 2N elements of the circular convolution of W and $[R^*(nN)E(nN)]$,
where W is the frequency domain window;
where $R^*(nN)$ is the DFT of the input signal, and
where $E(nN)$ is the DFT of an error of the input signal.

19. The method of claim 17 wherein the filtering of the input signal by the CFBLMS circuit module is according to the following equation:

$$C((n+1)N) = C(nN) - \frac{\beta}{4}\overline{W}X_{se}(nN)$$

where N refers to an N-dimensional vector of time-domain (TD) equalizer taps,
where C(nN) is the DFT of an output from the equalizer circuit module,
where $\beta$ is a step-size,
where W is the frequency domain window;
where $\overline{W}$ is a 2N×2N circular convolution matrix;
where $X_{se}(nN)=R^*(nN)E(nN)$
where $R^*(nN)$ is the DFT of the input signal, and
where E(nN) is the DFT of an error of the input signal.

20. The method of claim 17 wherein filtering by the CFBLMS circuit module is such that the 2N×2N circular convolution matrix $\overline{W}$ is defined by.

$$\begin{bmatrix} 1 & j0.75 & -0.5 & -j0.25 & 0 & \ldots & 0 & j0.25 & -0.5 & -j0.75 \\ -j0.75 & 1 & j0.75 & -0.5 & -j0.25 & \ldots & 0 & 0 & j0.25 & -0.5 \\ -0.5 & -j0.75 & 1 & j0.75 & -0.5 & \ldots & 0 & 0 & 0 & j0.25 \\ j0.25 & -0.5 & -j0.75 & 1 & j0.75 & \ldots & 0 & 0 & 0 & 0 \\ \vdots & \vdots & \vdots & \vdots & \vdots & \ddots & \vdots & \vdots & \vdots & \vdots \\ j0.75 & -0.5 & -j0.25 & 0 & 0 & \ldots & j0.25 & -0.5 & -j0.75 & 1 \end{bmatrix}.$$

\* \* \* \* \*